(12) United States Patent
Suzuki

(10) Patent No.: US 6,256,356 B1
(45) Date of Patent: Jul. 3, 2001

(54) RESOURCE ASSIGNING METHOD, COMMUNICATION RESOURCE ASSIGNING METHOD, AND BASE STATION AND TERMINAL UNIT

(75) Inventor: Mitsuhiro Suzuki, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/161,618

(22) Filed: Sep. 28, 1998

(30) Foreign Application Priority Data

Sep. 30, 1997 (JP) .................................... 9-267375

(51) Int. Cl.⁷ ........................... H04L 27/28; H04Q 7/20
(52) U.S. Cl. ........................ 375/260; 370/329; 370/458; 455/452
(58) Field of Search .................... 375/260, 295; 370/431, 436, 437, 442, 344, 342, 329, 330, 458; 455/450, 451, 452

(56) References Cited

U.S. PATENT DOCUMENTS 5,956,642 * 9/1999 Larsson et al. ................... 455/452
6,081,721 * 6/2000 Suzuki et al. .................... 455/450
6,157,627 * 12/2000 Olofsson et al. .................. 370/329

* cited by examiner

Primary Examiner—Tesfaldet Bocure
(74) Attorney, Agent, or Firm—Jay H. Maioli (57) ABSTRACT

A resource assigning method, a communication resource assigning method, and a base station and a terminal unit for enabling channels to be simply assigned if data (tasks) of different capacities are mixed together. If (n) continuous resources each having the same capacity (c) are assigned to a plurality of tasks having different sizes represented by $c \times 2^k$ (k=0, 1, 2, . . . , M), unavailable resource detecting processing detects the position (j) of an unavailable resource; unassigned resource setting processing defines as an unassigned resource the communication resource in a part $x_1$ to $x_6$ having a capacity of $c \times 2^k$ relative to the respective ends of the resource and defining the position (j) of the unavailable resource detected by the unavailable resource detecting processing, as unassigned resource; and a resource setting processing sequentially assigns the resource except for the position defined as unassigned one by the unassigned resource setting processing, to a task of a capacity of $c \times 2^k$ from the respective ends of the resource at an interval of this capacity and sequentially assigns a resource of a capacity smaller than $c \times 2^k$ that could not be assigned to a task of the same capacity at an interval of $c \times 2^{k-1}$ until (k) reaches a value that cannot be assigned.

13 Claims, 7 Drawing Sheets

FIG. 1

| LOGICAL CHANNEL NUMBER | N BAND SLOTS × M TIME SLOTS | STEP 1 | STEP 2 | STEP 3 | STEP 4 | STEP 5 | STEP 6 | TIME SLOT 0 | TIME SLOT 1 | TIME SLOT 2 | TIME SLOT 3 |
|---|---|---|---|---|---|---|---|---|---|---|---|
| 0 | 4X4 | | | | | | | | | | |
| 1 | 4X2 | 4-7 | | | | | | | | 1-2 | - |
| 2 | 4X2 | 8-11 | 0-5 | 6-11 | 3-11 | 12-16 | 7-16 | | 4-6 | 4-6 | 4-6 |
| 3 | 4X2 | 12-15 | 16-19 | 16-19 | 16-19 | 16-19 | 16-19 | 16-19 | 12-16 | 8-16 | 12-6 |
| 4 | 2X4 | 16-19 | 4-7 | 4-7 | 4-7 | 4-7 | 4-7 | 4-7 | 16-19 | 16-19 | 16-19 |
| 5 | 2X1 | 20-23 | 20-23 | 20-23 | 20-23 | 20-23 | 20-23 | 20-23 | 4-7 | 20-23 | 20-23 |
| 6 | 2X1 | 24-27 | 24-27 | 24-25 | 26-27 | 26-27 | 26-27 | 26-27 | 20-23 | 4-7 | 4-7 |
| 7 | 2X1 | | 8-11 | 8-9 | 12-13 | 12-13 | 12-13 | 12-13 | 26-27 | 26-27 | 26-27 |
| 8 | 1X4 | | 12-15 | 12-13 | 2-3 | 2-3 | 2-3 | 2-3 | 12-13 | 30-31 | 2-3 |
| 9 | 1X2 | | | 26-27 | 30-31 | 30-31 | 30-31 | 30-31 | 2-3 | 30-31 | 30-31 |
| 10 | 1X2 | | | 10-11 | 14-15 | 14 | 10 | 10 | 30-31 | 2-3 | 12-13 |
| 11 | 1X2 | | | 14-15 | 8-9 | 8 | 9 | 9 | 10 | 10 | 10 |
| 12 | 1X1 | | | 2-3 | 24-25 | 24 | 15 | 15 | 9 | 32 | 32 |
| 13 | 1X1 | | | 30-31 | 10-11 | 10 | 1 | 1 | 15 | 8 | 8 |
| 14 | 1X1 | | | | | 15 | 32 | 32 | 1 | 9 | 9 |
| 15 | 1X1 | | | | | 9 | 24 | 24 | 24 | 11 | 14 |
| 16 | 1X1 | | | | | 25 | 8 | 8 | 14 | 15 | 24 |
| 17 | 1X1 | | | | | 11 | 14 | 14 | 25 | 24 | 15 |
| 18 | 1X1 | | | | | 1 | 25 | 25 | 11 | 1 | 11 |
| 19 | 1X1 | | | | | 32 | 11 | 11 | 8 | 25 | 25 |
| 20 | 1X1 | | | | | | | | | | 1 |

FIG. 2

| BAND SLOT NUMBER | TIME SLOT 0 | TIME SLOT 1 | TIME SLOT 2 | TIME SLOT 3 |
|---|---|---|---|---|
| 0 | G | G | G | G |
| 1 | 10 | 10 | 15 | 16 |
| 2 | 5 | 6 | 5 | 4 |
| 3 | 5 | 6 | 5 | 4 |
| 4 | 1 | 1 | 2 | 2 |
| 5 | 1 | 1 | 2 | 2 |
| 6 | 1 | 1 | 2 | 2 |
| 7 | 1 | 1 | 2 | 2 |
| 8 | 13 | 15 | 9 | 9 |
| 9 | 8 | 8 | 10 | 10 |
| 10 | 7 | 7 | 7 | 7 |
| 11 | 16 | 16 | 11 | 14 |
| 12 | 4 | 4 | 6 | 6 |
| 13 | 4 | 4 | 6 | 6 |
| 14 | 14 | 12 | 14 | 11 |
| 15 | 9 | 9 | 12 | 13 |
| 16 | 0 | 0 | 0 | 0 |
| 17 | 0 | 0 | 0 | 0 |
| 18 | 0 | 0 | 0 | 0 |
| 19 | 0 | 0 | 0 | 0 |
| 20 | 2 | 2 | 1 | 1 |
| 21 | 2 | 2 | 1 | 1 |
| 22 | 2 | 2 | 1 | 1 |
| 23 | 2 | 2 | 1 | 1 |
| 24 | 12 | 11 | 13 | 12 |
| 25 | 15 | 13 | 16 | 15 |
| 26 | 3 | 3 | 3 | 3 |
| 27 | 3 | 3 | 3 | 3 |
| 28 | J | J | J | J |
| 29 | J | J | J | J |
| 30 | 6 | 5 | 4 | 5 |
| 31 | 6 | 5 | 4 | 5 |
| 32 | 11 | 14 | 8 | 8 |
| 33 | G | G | G | G |

RESOURCE ASSIGNING METHOD, COMMUNICATION RESOURCE ASSIGNING METHOD, AND BASE STATION AND TERMINAL UNIT

BACKGROUND OF THE INVENTION

1. Field of the Invention

The present invention relates to a resource assigning method for assigning various resources to predetermined tasks for processing, and more particularly to an improvement of assigning method preferable for a communication resource assigning method for assigning communication resources such as prepared frequency bands to a plurality of communication information for transmission. The present invention relates to a base station and a terminal unit to which this communication resource assigning method is applicable.

2. Description of the Related Art

Mobile communication using a radio telephone system involves multiple accesses in which a plurality of mobile stations (terminal units) are connected to a single base station. In the case of radio telephones, a single base station is used by a large number of terminal units, so various communication methods have been proposed that serve to avoid interference among terminal units. Conventional communication methods of this kind include, for example, Frequency Division Multiple Access (FDMA), Time Division Multiple Access (TDMA), and Code Division Multiple Access (CDMA).

For example, in the TDMA method, one transmission band (a frequency channel) is separated using a predetermined time unit in order to form time slots, and a predetermined number of time slot periods form one TDMA frame. Each time slot in one TDMA frame is assigned to each terminal unit so that a plurality of terminal units can be connected to a base station using one transmission band.

In communication methods other than the TDMA method, basically, slots replacing the time slots used in the TDMA method are formed in a predetermined manner to enable multiple accesses.

Whatever communication method is applied, the capacity that can be transmitted during one time (for example, one time slot in the TDMA method) is fixed and the transmission capacity between a base station and a terminal unit is constant. Radio telephone systems generally set the amount of speech data that can be transmitted.

Recent radio telephone systems, however, may transmit various data (for example, facsimile image data, electronic mail data, and Internet data) other than speech data as transmit data, and a constant transmission capacity suitable for speech data is often insufficient for these data.

In a radio telephone system using such data, the transmission capacity is preferably variable, but if a plurality of data having different transmission capacities are mixed together as transmit data manipulated by each base station, the control of transmission will be complicated. That is, to appropriately determine how to assign a communication resource such as a frequency band to each base station in order to set the capacity of communication with each terminal unit, the number of terminal units simultaneously connected and the communication capacity of each terminal unit must be determined in assigning channels. Then, complicated control is required to assign appropriate channels in real time depending on the number of terminals and the communication capacity that constantly vary.

In particular, to execute frequency hopping in which the frequency used between a terminal unit and a base station is sequentially switched so that prepared frequency bands can be evenly used, channels must be assigned in such a way that if a plurality of communication lines of different capacities are mixed together, they can be frequency-switched appropriately. Thus, much complicated control is required.

The problem has been described which may occurs when a radio telephone system requires lines of different transmission capacities to be mixed together for communication. However, if, for example, a data processing unit such as a computer unit requires data (tasks) of different capacities to be mixed together for data processing and the data of the respective capacities are assigned to certain items (resources) for processing, the assigning processing will be complicated.

SUMMARY OF THE INVENTION

In view of the foregoing, an object of the present invention is to provide a resource assigning method, a communication resource assigning method, and a base station and a terminal unit in which, channels are to be simply assigned if data (tasks) of different capacities are mixed together.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of the present invention will be described with reference to the accompanying drawings:

This embodiment is applied to a cellular radio telephone system, and the configuration of a communication system is described to which this embodiment is applied. The communication method used in this embodiment is basically a system for executing communication using the TDMA method, and transmits multicarrier signals within each time slot. In a multicarrier method, a plurality of subcarriers are continuously arranged within a pre-assigned band, and are then simultaneously used by one transmission path. Furthermore, the plurality of subcarriers within one band are temporally divided for modulation.

Figure 4:
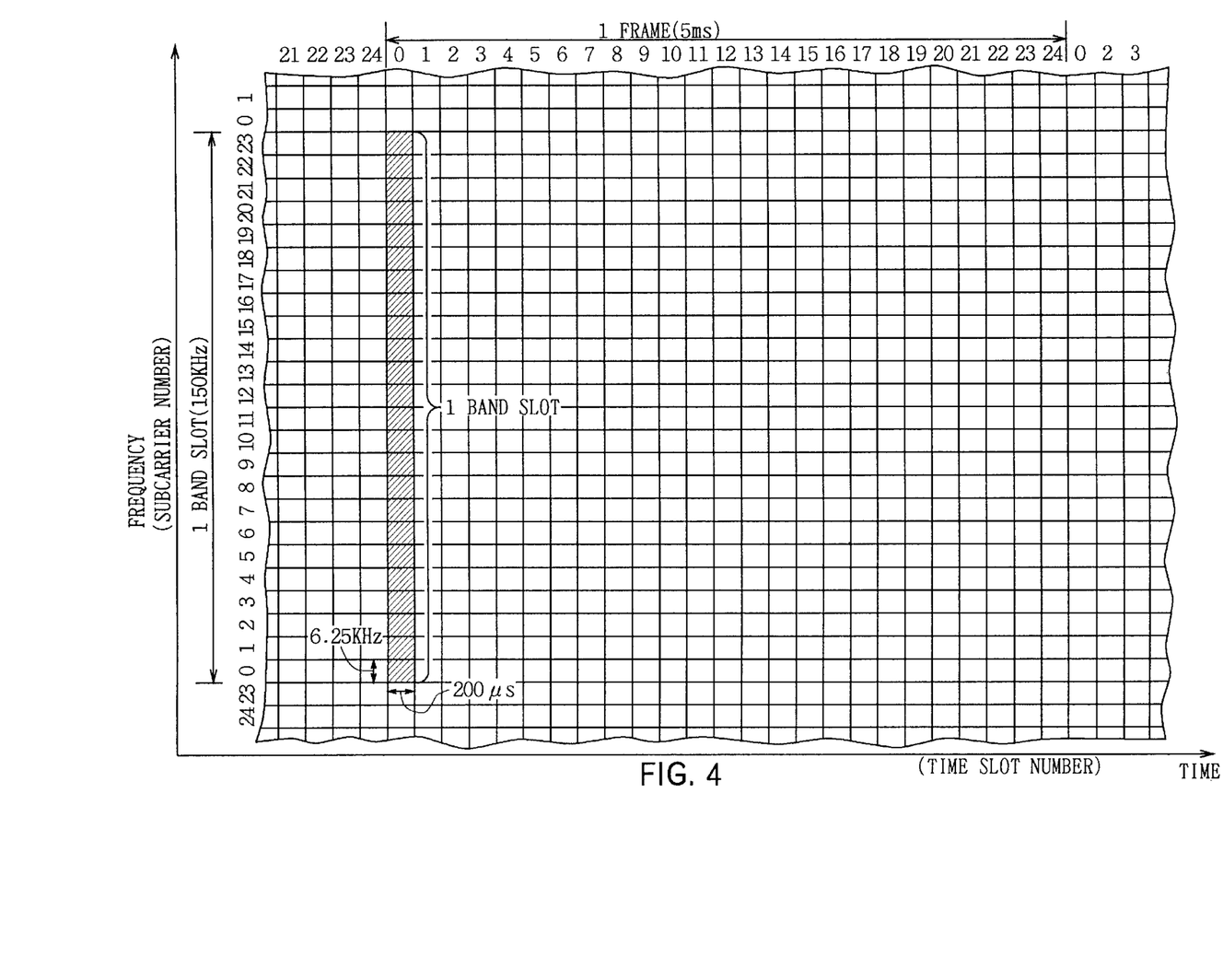
FIG. 4 is an explanatory drawing showing a configuration of slots for a transmit signal according to the embodiment of the present invention.

The basic configuration of this connection method is described below. FIG. 4 shows a configuration of slots for transmit signals according to this embodiment, wherein the vertical axis indicates the frequency while the horizontal axis indicates the time. This embodiment provides an orthogonal base obtained by dividing the frequency axis and the time axis into a lattice. That is, one transmission band (one band slot) corresponds to 150 kHz and 24 subcarriers are arranged within one transmission band of 150 kHz. The 24 subcarriers are continuously arranged at an equal interval of 6.25 kHz and are each numbered from 0 to 23. Actually, however, only 22 subcarriers numbered from 1 to 22 are present, and the subcarrier numbers 0 and 23 at the respective ends of one band slot are guard bands in which no subcarriers are provided and which have zero power. For example, the difference in phase among the 22 subcarriers is used to transmit data.

Figure 5A:
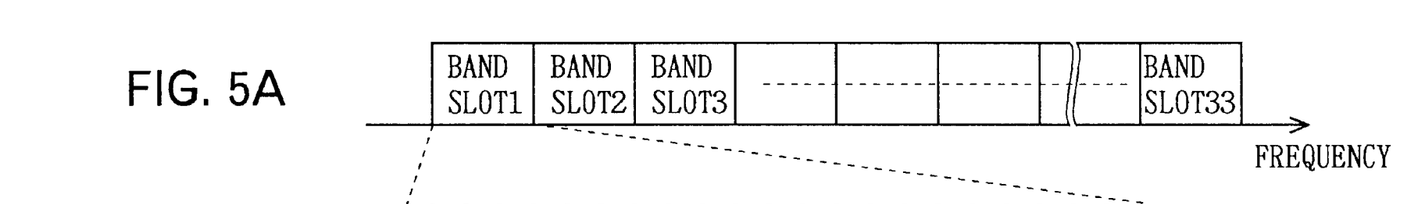
FIGS. 5A and 5B are explanatory drawings showing an arrangement of band slots according to the embodiment of the present invention.
Figure 5B:
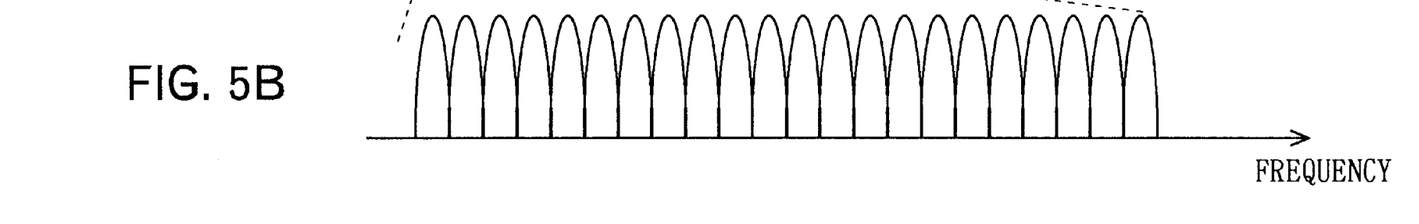

Thirty four band slots each configured as described above comprise one transmission unit on a frequency. As shown in FIG. 5A, the 34 continuous band slots from a 0-th to a 33-rd band slots are used as one transmission unit (one system band) on a frequency, and each band slot simultaneously uses 22 multicarrier signals for transmission as shown in FIG. 5B. Each base station arranges a predetermined number of system bands each composed of 34 band slots, within a communication band assigned to that base station. One band slot corresponds to 150 kHz, so if one system band composed of 34 band slots requires 1 MHz, and a frequency band of 5.1 MHz is assigned to a base station, then one system band is provided for the base station. If a frequency band of 10.2 MHz is assigned, then two system bands are provided for the base station.

Returning to FIG. 4, the configuration of the time axis is described. One time slot is defined at an interval of 200 $\mu$s, and a burst signal is modulated on the 22 subcarriers in each time slot for transmission. One frame is defined as a state in which 25 time slots have been arranged. The 25 time slots in one frame is continuously numbered from 0 to 24. The hatched range shown in FIG. 4 shows one time slot section of one band slot.

This orthogonal base obtained by dividing the frequency axis and the time axis into a lattice is used for multiple accesses in which a base station simultaneously communicates with a plurality of terminal units. Frequency switching processing called "frequency hopping" is carried out in which the band slot used for communication between the base station and each of the terminal units is switched for each communication session. For example, since the base station and each terminal unit mutually communicate at an interval of a predetermined number of time slots, a communication system circuit switches the transmission frequency channel (the band slot) during a time slot period during which the terminal unit does not communicate. The band slot is switched within one unit of transmission frequencies shown in FIGS. 5A and 5B (that is, within one system band composed of 34 band slots). For example, frequency hopping enables a plurality of band slots provided at one base station to be evenly used by a plurality of terminal units connected to the base station.

By setting the communication state in this manner, signals transmitted between each terminal unit and the base station can maintain orthogonality relative to the other signals and are not interfered with by them. Thus, only corresponding signals can be obtained appropriately. Then, frequency hopping is used to switch the transmitting band slot as required, so the transmission band provided at each base station can be effectively used to enable efficient transmission. In this case, since the frequency band assigned to one base station (cell) can be freely determined as described above, the system can be freely set depending on the situation.

Figure 1:
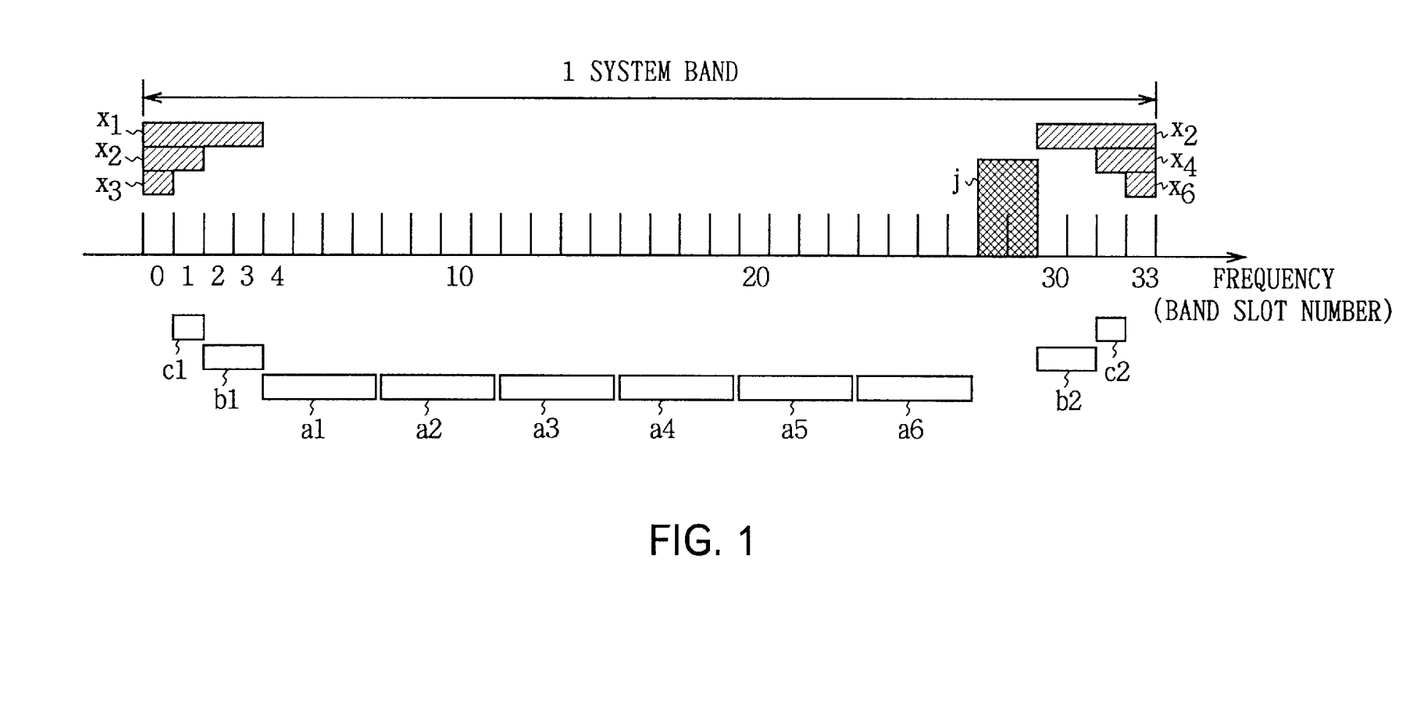
FIG. 1 is an explanatory drawing showing a frequency assigned state according to an embodiment of the present invention.
Figure 2:
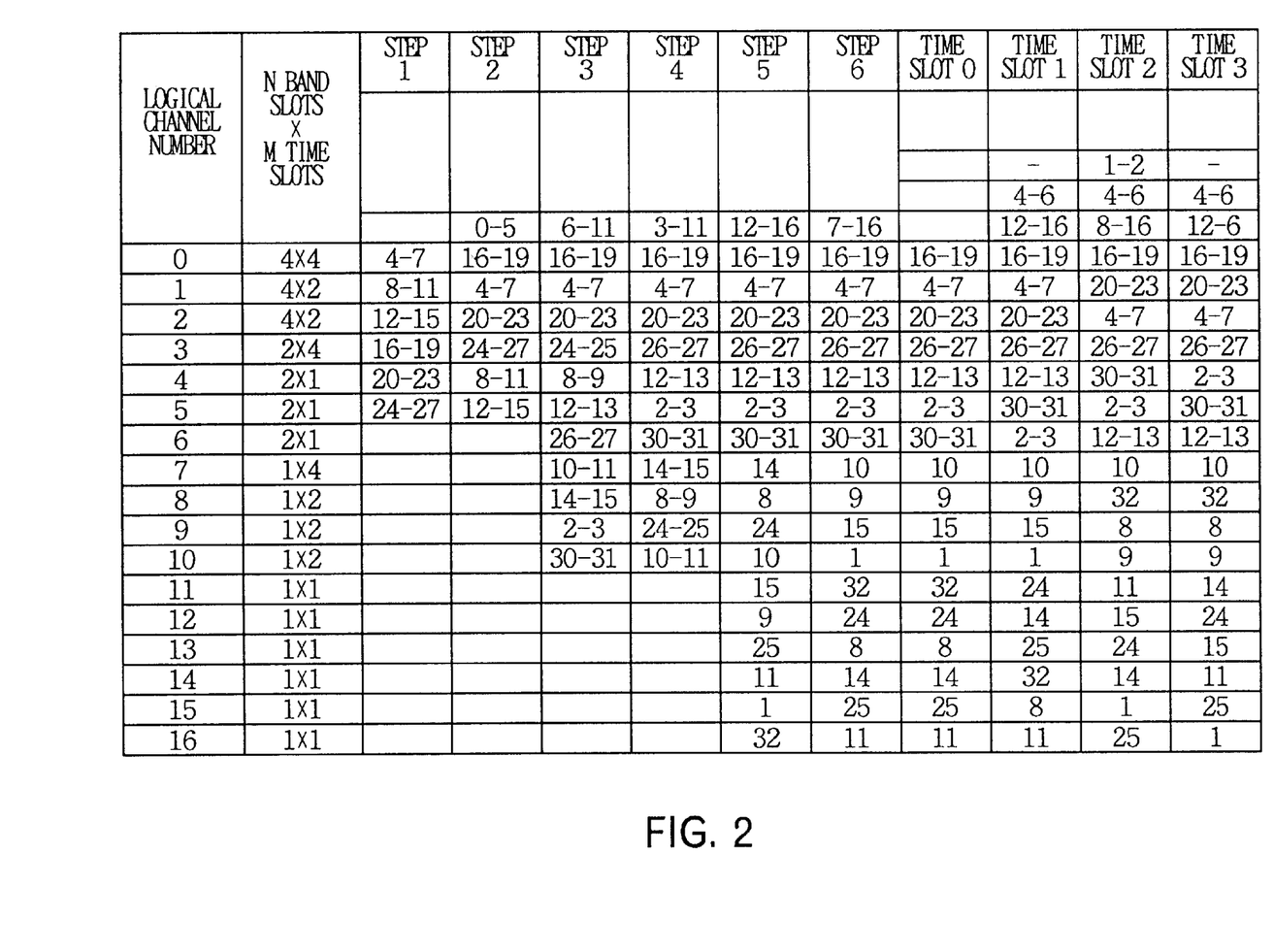
FIG. 2 is an explanatory drawing showing an example of the correspondence between logical channel numbers and band slot numbers according to the embodiment of the present invention.
Figure 3:
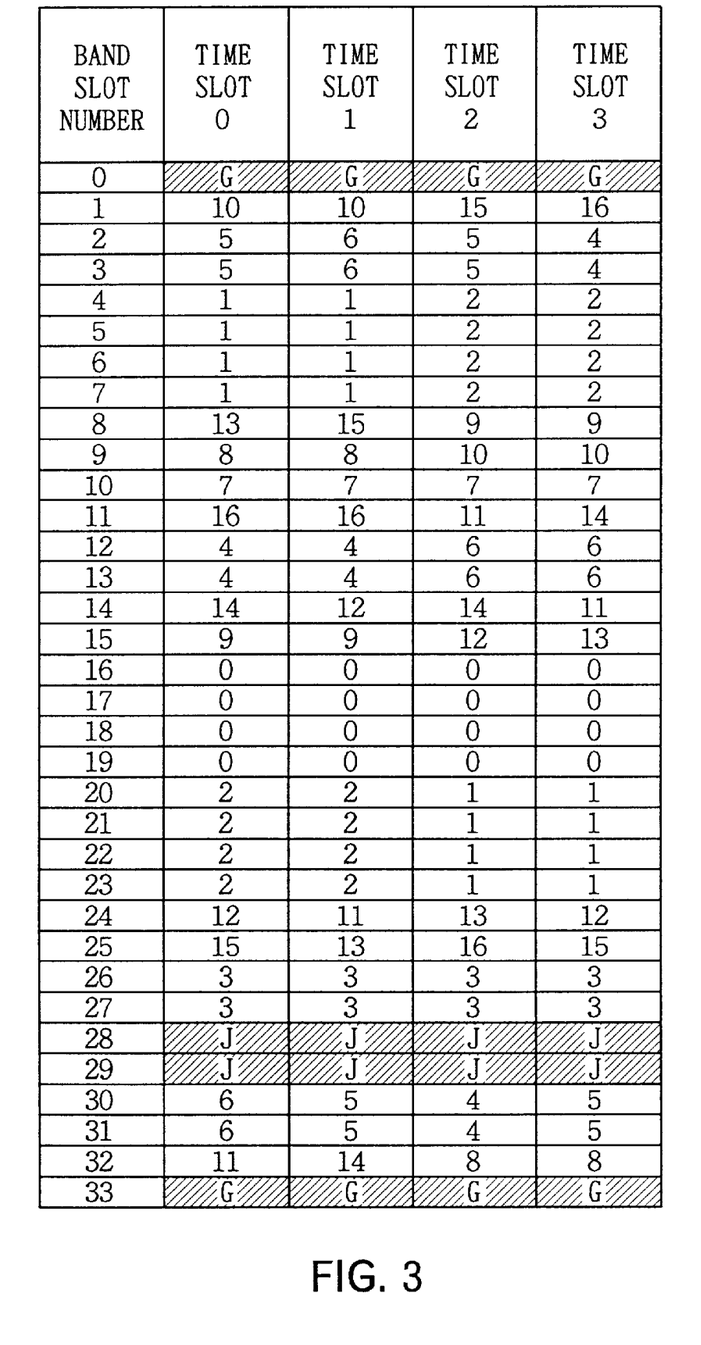
FIG. 3 is an explanatory drawing showing an example of logical channel numbers assigned to band slot according to the embodiment of the present invention.

Channel assignment using the communication resources in which the orthogonal base is configured by dividing the frequency axis and the time axis into a lattice is described with reference to FIGS. 1 to 3. FIG. 1 shows a frequency assigned state for 34 band slots numbered from 0 to 33 within one system band according to this embodiment. In addition, FIG. 2 shows an example of the correspondence between logical channel numbers and band slot numbers when the frequency assignment shown in FIG. 1 is used for communication. FIG. 3 shows the assignment of the logical channels shown in FIG. 2, in terms of the band slot numbers.

First, the capacity of signals transmitted between a base station and a terminal unit is described. The minimum unit is a capacity transmitted using [one band slot×one time slot] and the transmission capacity can be varied by integer-multiplying the minimum unit. One communication unit can transmit a capacity up to 16 times as large as that of [4 band slots×4 time slots].

In the example shown in FIG. 2, when the number of band slots is defined as N, the number of time slots is defined as M, and the capacity is expressed by [N×M], a total of 17 logical channels are assigned, including one [4×4] logical channel, two [4×2] logical channels, one [2×4] logical channel, three [2×1] logical channels, one [1×4] logical channel, three [1×2] logical channels, and six [1×1] logical channels.

When the transmission capacity is set in this manner, the guard bands must be determined using the maximum number of band slots for the transmission capacity. In this example, since the maximum number of band slots for one logical channel is four, guard band sections $x_1$ and $x_2$ each comprising four band slots are set at the respective ends of one system band shown in FIG. 1. The guard band section $x_1$ corresponds to a band with band slot numbers 0, 1, 2, and 3, whereas the guard band section $x_2$ corresponds to a band with band slot numbers 30, 31, 32, and 33.

For guard bands of a 2-band-slot width comprising two continuous band slots within one logical channel, guard band sections $x_3$ and $x_4$ are also set at the respective ends of one system band as shown in FIG. 1. The guard band section $x_3$ corresponds to a band with the band slot numbers 0 and 1, whereas the guard band section $x_4$ corresponds to a band with the band slot numbers 32 and 33.

Furthermore, for guard bands of a 1-band-slot width comprising only one band slot within one logical channel, guard band sections $x_5$ and $x_6$ are also set at the respective ends of one system band as shown in FIG. 1. The guard band section $x_5$ corresponds to a band with the band slot number 1, whereas the guard band section $x_6$ corresponds to a band with the band slot number 33.

According to this embodiment, a base station detects within a one prepared system band those bands in which an interfering wave may be present in order to avoid using these bands. For example, in the example shown in FIG. 1, two band slot sections with band slot numbers 28 and 29 are recognized as bands (j) with an interfering wave and are not used in assignment processing.

Once the above processing has been finished, the band except for the guard band section and the band with an interfering wave is used to set bands to which each signal can be assigned, as shown in FIG. 1. Bands to which a signal occupying up to four band slots can be assigned include a band a1 with band slot numbers 4 to 7, a band a2 with band slot numbers 8 to 11, a band a3 with band slot numbers 12 to 15, a band a4 with band slot numbers 16 to 19, a band a5 with band slot numbers 20 to 23, and a band a6 with band slot numbers 24 to 27.

According to this embodiment, bands each corresponding to two band slots are present between the guard band sections $x_1$ and $x_2$ for 4-band-slot signals and the guard band sections $x_3$ and $x_4$ for 2-band-slot signals, respectively. Thus, a band to which a signal occupying up to two band slots can be assigned is set in the two band slots. That is, bands to which a 2-band-slot signal can be assigned are set as a band b1 with the band slot numbers 2 and 3 and a band b2 with the band slot numbers 30 and 31. Furthermore, bands each corresponding to one band slot are present between the guard band sections $x_3$ and $x_4$ for 2-band-slot signals and the guard band sections $x_5$ and $x_6$ for 1-band-slot signals, respectively. Thus, a band to which a 1-band-slot signal can be assigned is set in the one band slot. That is, bands to which a 1-band-slot signal can be assigned are set as a band c1 with the band slot number 1 and a band c2 with the band slot number 32.

As shown in FIG. 2, assignment is actually executed with reference to the frequency assigned state shown in FIG. 1. Steps 1 to 6 shown in FIG. 2 correspond to this assignment processing and are sequentially described below. As shown in FIG. 1, since the logical channel numbers are set in such a way that six bands a1 to a6 are prepared in each of which four band slots are continuously used, the band slot numbers of the bands a1 to a6 to which a signal requiring four continuous band slots can be assigned are sequentially assigned to the six channels with logical channel numbers 0 to 5, at step 1.

At step 2, the band slot numbers 0 to 5 of the logical channel numbers are randomly changed using predetermined pseudo random numbers prepared at the base station. In FIG. 2, the double lines indicate that random changing processing has been executed for these channels. This embodiment actually provides the logical channels 0 to 2 to use four continuous band slots (that is, logical channels for which the number of band slots N is four), so the band slot numbers are fixed to the three channels with the logical channel numbers 0 to 2.

Next, at step 3, a signal transmitted over the logical channels 3 to 5 uses two continuous band slots, so there are two extra band slots in each of the bands a4 to a6 to which the logical channel numbers 3 to 5 are assigned. Thus, each of the band slots in the bands a4 to a6 is divided into two, and the parts newly obtained are assigned to logical channel numbers 6 to 8. Specifically, for example, the band slot numbers 24 to 27 of the logical channel number 3 at step 2 are re-assigned to the band slot numbers 24 and 25 at step 3, while the remaining band slot numbers 26 and 27 are newly assigned to the logical channel number 6. Logical channel numbers 7 and 8 are similarly assigned.

In addition, at step 3, logical channels having two or less band slots are assigned to the bands b1 and b2 that can only be assigned to signals requiring two or less band slots. That is, the band slot numbers 2 and 3 of the band b1 are assigned to a logical channel number 9, while the band slot numbers 30 and 31 of the band b2 are assigned to a logical channel number 10.

Next, at step 4, the band slot numbers of logical channel numbers 3 to 10 that are being set and that do not include the previously fixed logical channel numbers 0 to 2 are randomly changed using the pseudo random numbers prepared at the base station. Since this embodiment actually uses the logical channels 3 to 6 to provide two continuous band slots (that is, logical channels for which the number of band slots N is two), the band slot numbers are fixed to the four channels with the logical channel numbers 3 to 6.

Next, at step 5, a signal transmitted over the logical channels 7 to 10 uses only one band slot, so there is one extra band slot in each of the bands in the time slots set as the logical channel numbers 7 to 10. Thus, each of the band slots is divided into two, and the parts newly obtained are assigned to logical channel numbers 11 to 14. Specifically, for example, the band slot numbers 14 and 15 of the logical channel number 7 at step 4 are re-assigned to the band slot number 14 at step 5, while the remaining band slot number 15 is newly assigned to the logical channel number 11. Logical channel numbers 12, 13, and 14 are similarly assigned.

In addition, at step 5, logical channels having one band slot are assigned to the bands c1 and c2 that can only be assigned to signals requiring one band slot. That is, the band slot number 1 of the band c1 is assigned to a logical channel number 15, while the band slot number 32 of the band c2 is assigned to a logical channel number 16.

Next, at step 6, the band slot numbers of logical channel numbers 7 to 16 that do not include the previously fixed logical channel numbers 0 to 6 are randomly changed using the pseudo random numbers prepared at the base station.

Data on the band slot number of each logical channel obtained at step 6 is actually used by the base station to communicate with the terminal units. If the frequency hopping operation for switching the frequency is not executed during communication, the band slot number of each logical channel obtained at step 6 can be set during communication. Since, however, this embodiment uses frequency hopping, the band slot numbers are moved among each of the time slots in which communication is executed. For example, FIG. 2 shows the processing of a 4-time-slot period from time slot 0 to time slot 3. The time slot 0 directly uses the band slot number of each logical channel set at step 6.

Next, in the time slot 1, the logical channel numbers 11 to 16 having a band slot width of 1 are each assigned with one time slot, the band slot numbers are randomly moved within this range using pseudo random numbers. The logical channel number 7 is assigned with four continuous time slots and the logical channel numbers 8 to 10 are assigned with two continuous time slots, so the band slots are not moved. The logical channel numbers 3 to 6 of a 2-band-slot width and the logical channel numbers 0 to 2 of a 4-band-slot width are similarly processed. That is, in the time slot 1, of the logical channel numbers 3 to 6 having a 2-band-slot width are each assigned with one time slot, the logical channel numbers 4 to 6 are assigned with one time slot, so the band slot numbers are randomly moved within this range using pseudo random numbers. Thus, the band slot numbers are not moved among signals with different band slot widths.

In the time slot numbers 2 and 3, the band slot numbers are similarly moved among the signals of the logical channels of the same band slot width which are movable. This processing is sequentially repeated as long as the communication lasts.

FIG. 3 shows the correspondence between the band slot numbers and the logical channel numbers set in this manner, in terms of the band slot numbers.

By assigning the channels in this manner, the prepared transmission bands (communication resources) can be effectively and efficiently assigned to a plurality of communication information (tasks) having different sizes. The setting of each logical channel in terms of [the number of band slots×the number of time slots] provided in FIG. 2 is only logical, and in the actual communication of user information, one logical channel may be divided so as to transmit a plurality of user information through this logical channel.

The channel assigning processing shown in FIGS. 1 and 2 can be summarized as follows. To assign a plurality of communication information having different sizes with communication resources each composed of (n) ((n) is an arbitrary integer) continuous slots each having the same capacity, the following steps are executed when the capacity of each slot is defined as (c) and when the size of the plurality of communication information is expressed as $c \times 2^k$ (k=0, 1, 2, . . . , M).

The steps comprise an unavailable slot detecting step for detecting the positions of unavailable slots; an unassigned communication resource setting step for defining as an unassigned resource, the communication resource in a part having a capacity of $c \times 2^k$ relative to the respective ends of a communication resource of (n) continuous slots and defining the unavailable communication resource detected in the unavailable slot detecting step, as an unassigned resource; a k-th communication resource assigning step for sequentially assigning the communication resource except for said unassigned part, from the respective ends at intervals of a capacity of $c \times 2^k$; a first repeating loop for sequentially repeating the unassigned communication resource setting step and k-th communication resource assigning step until (k) has changed from M to 0, using that communication resource of a capacity less than $c \times 2^k$ which could not be assigned in the k-th communication resource assigning step, as an original communication resource in the subsequent (k−1)-th communication resource assigning step; a k-th communication information assigning step for assigning $c \times 2^k$ of communication information with $c \times 2^k$ of communication resource assigned by the repetition and after assigning this resource to all of the $c \times 2^k$ of communication information, assigning a resource to $c \times 2^{k-1}$ of communication information if there is a resource remaining; a k-th communication information assignment changing step for changing the correspondence relationship between the communication resource and the communication information assigned during the k-th communication information assigning step; a (k−1)-th resource synthesizing step for dividing into two the resources to which the capacity of $c \times 2^{k-1}$ was assigned during said k-th communication information assigning step and which were then changed by said k-th assignment changing step and synthesizing these resources and the resource assigned by the (k−1)-th communication resource assigning step, as an original resource in a (k−1)-th communication information assigning step; and a second repeating loop for sequentially repeating the k-th communication information assigning step, the communication information assignment changing step, and the (k−1)-th communication resource synthesizing step until (k) changes from M to 0.

The communication information assignment changing step for changing the correspondence relationship between the communication resources and the communication information assigned at the communication information assigning step is required only if frequency hopping is used. Otherwise, this step is not required.

An example of a configuration of a base station that assigns channels as described above and that actually communicates with terminal units is described with reference to FIG. 6.

Figure 6:
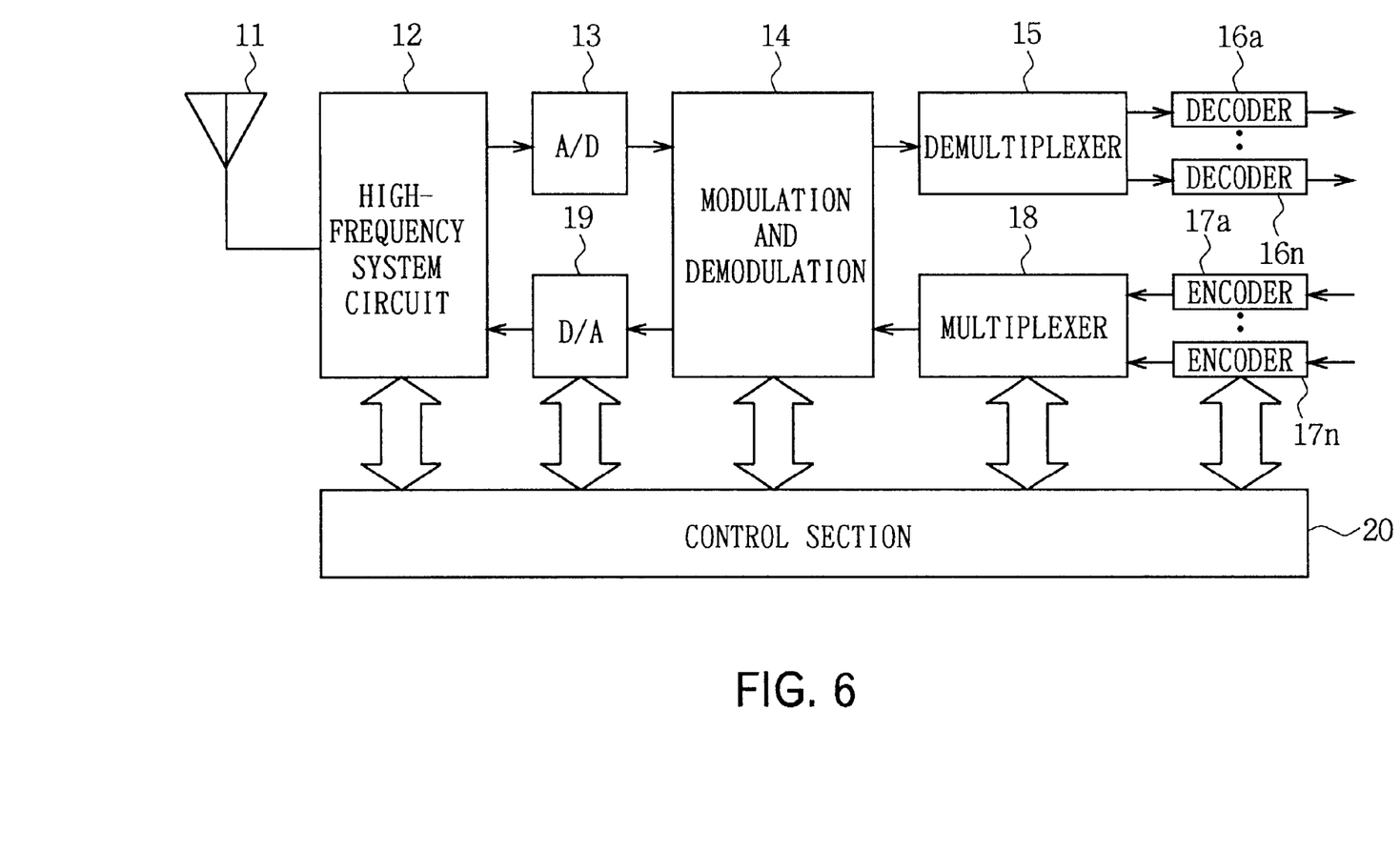
FIG. 6 is a block diagram showing a configuration of a base station according to the embodiment of the present invention.

FIG. 6 is a block diagram showing the overall configuration of the base station according to the present invention. A transmitting and receiving antenna 11 is connected to a high-frequency system circuit 12 that converts a signal of a predetermined frequency band (this frequency band corresponds to a signal of one transmission unit composed of 32 band slots) received by the antenna 11, into an intermediate-frequency signal. The intermediate-frequency signal is then converted by an analog/digital converter 13 into digital data, which is then supplied to a modulating/demodulating section 14. The modulating/demodulating section 14 demodulates the supplied intermediate-frequency signal. This demodulating processing is, for example, orthogonal conversion in which data that has been distributed over 22 subcarriers and modulated before transmission is converted into one sequence of data. The demodulated data is then supplied to a demultiplexer 15 that separates it into data transmitted from each terminal unit, which are supplied to separate decoders 16a, 16b, . . . 16n ((n) is an arbitrary integer). During the separation executed by the demultiplexer 15, the separated frequency positions (band slots) are changed as required taking the frequency hopping into account, before the data is supplied to each of the decoders 16a to 16n.

The number of the decoders 16a to 16n equals the number of terminal units, and each of the decoders 16a to 16n decodes data supplied from terminal units. The data decoded by each of the decoders 16a to 16n is supplied to another communication system (not shown) connected to the base station, and is then transmitted to the destinations connected to the respective terminal units via telephone lines. Control data such as a connection request that is transmitted from a terminal unit to the base station is decoded by one of the decoders 16a to 16n and then supplied to a control section 20 of the base station.

Next, a configuration of a transmission system of the base station is described. Data transmitted from initiators to the base station for the respective connected terminal units is supplied to separate encoders 17a, 17b, . . . 17n ((n) is an arbitrary number). As in the decoders, the number of encoders 17a to 17n equals the number of terminal units that can be simultaneously connected to one base station, and each of the encoders 17a to 17n encodes supplied data. The data encoded by each of the encoders 17a to 17n is supplied to a multiplexer 18, which converts into one sequence of transmit data, all transmit data that is to be processed by this base station and which then supplies it to the modulating/demodulating section 14. The modulating/demodulating section 14 distributes the supplied data over the 22 subcarriers for modulation, and the modulated data is converted by a digital/analog converter 19 into an analog signal, which is then supplied to the high-frequency system circuit 12. The circuit 12 converts the frequency of the signal into a predetermined frequency band (this frequency band corresponds to a signal of one transmission unit composed of 32 band slots), and the converted signal is radio-transmitted through the antenna 11. Control data transmitted from the control section 20 of the base station to a terminal unit is supplied to one of the encoders 17a to 17n and encoded therein. The data is then radio-transmitted via a transmission system from the multiplexer 18 through the high-frequency system circuit 12.

The above configuration is used to execute radio communication between the base station and terminal units, and the communication is controlled by the control section 20 of the base station. The control section 20 is composed of a control means such as a microcomputer, and control data generated by the control section 20 is radio-transmitted to a terminal unit to control communication with each terminal unit. The control section 20 also assigns the channels as described above with reference to FIGS. 1 to 3. Thus, the control section 20 determines from a received signal band slots in which an interfering wave is present as well as the capacity of data transmitted in order to determine that band to which the channels can be assigned, and sets the band slots for the logical channels within this band, at the step shown in FIG. 2. Thus, the control section 20 also generates data on pseudo random numbers that is used to randomly change the band slot numbers. In addition, data required to assign the channels is transmitted to each terminal unit on control information so that the terminal unit can carry out the same channel assignment. Specifically, data on the setting of [the number of band slots N×the number of time slots M] on each logical channel is transmitted to terminal units. Data on the pseudo random numbers used to randomly change the band slot numbers is also transmitted to terminal units.

Next, a configuration of a terminal unit radio-communicating with the base station is described with reference to FIG. 7.

Figure 7:
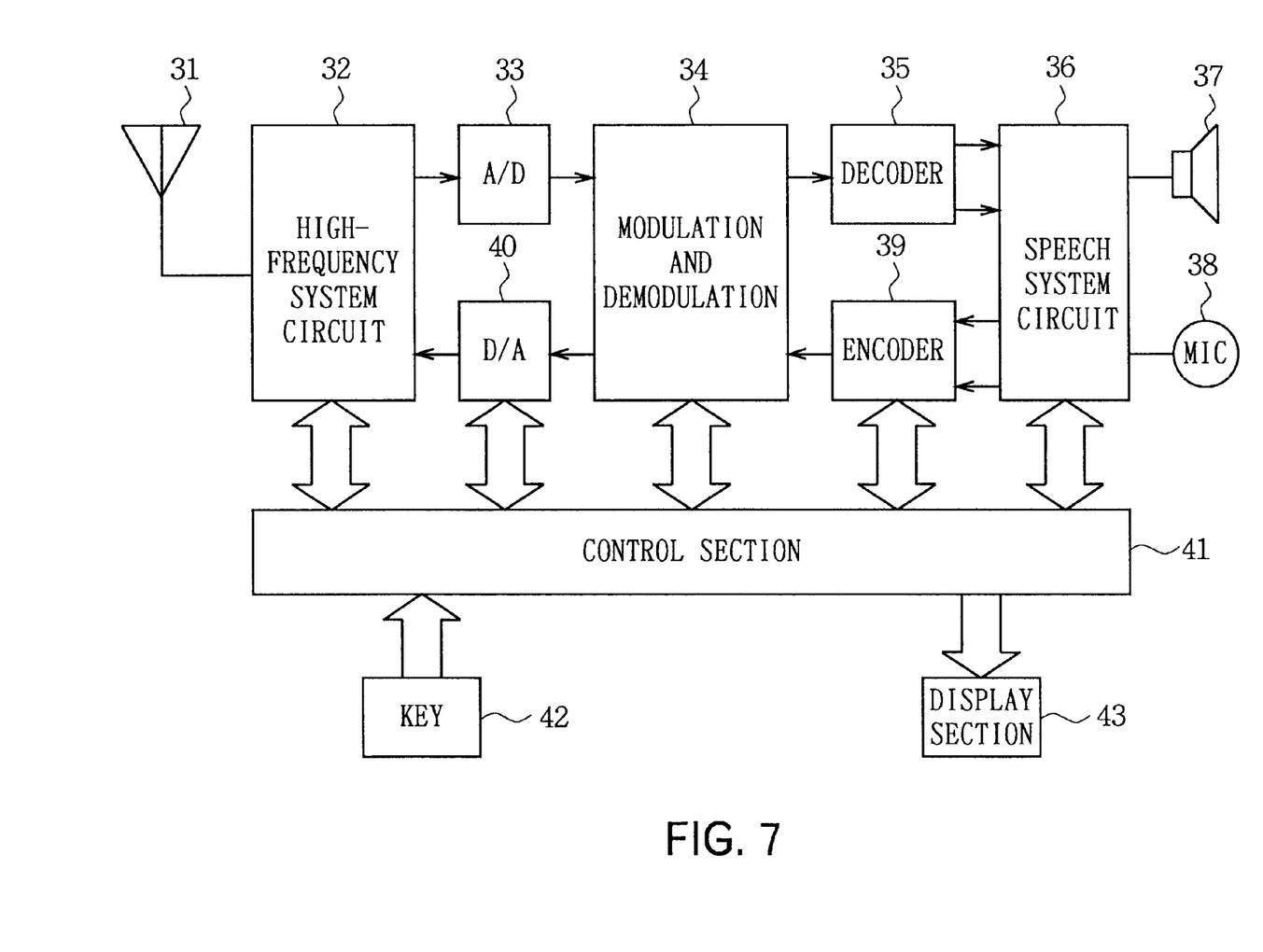
FIG. 7 is a block diagram showing a configuration of a terminal unit according to the embodiment of the present invention.

FIG. 7 is a block diagram showing the overall configuration of a terminal unit according to this embodiment. A transmitting and receiving antenna 31 is connected to a high-frequency system circuit 32 that converts a signal of a predetermined frequency band (this frequency band corresponds to a signal of one band slot) received by the antenna, into an intermediate-frequency signal. The intermediate-frequency signal is then converted by an analog/digital converter 33 into digital data, which is then supplied to a modulating/demodulating section 34. The modulating/demodulating section 34 demodulates the supplied intermediate-frequency signal. This demodulating processing is, for example, orthogonal conversion in which data that has been distributed over 22 subcarriers and modulated before transmission as described in the transmission method (the BMDA method) is converted into one sequence of data. The demodulated data is then supplied to a decoder 35 that decodes the data transmitted from the base station. The data decoded by the decoder 35 is supplied to a speech processing system circuit 36 to process speech data, and a speech signal obtained is released from a speaker 37. In addition, if control data from the base station has been decoded, it is supplied to a control section 41 of this terminal unit. If data (image data or electronic mail data) other than speech data has been received and decoded, a circuit (not shown) that processes corresponding data is connected to the speech processing system circuit 36 for processing.

Next, a configuration of a transmission system of the terminal unit is explained. If transmitted data is for a speech, a speech signal picked up by a microphone 38 is supplied to the speech processing system circuit 36 to obtain speech data based on a predetermined method, and this speech data is supplied to an encoder 39 for encoding. In addition, if data (image data or electronic mail data) other than speech data is transmitted, it is supplied from a processing circuit via the speech processing circuit 36 to the encoder 39 for encoding. The data encoded by the encoder 39 is supplied to the modulating/demodulating section 34. The modulating/demodulating section 34 distributes the supplied data over the 22 subcarriers for modulation, and the modulated data is converted by a digital/analog converter 40 into an analog signal, which is then supplied to the high-frequency system circuit 32. The circuit 32 converts the frequency of the signal into a predetermined frequency band, and the converted signal is radio-transmitted through the antenna 31. Control data such as a connection request transmitted from the control section 41 of the terminal unit 41 to the base station is supplied to the encoder 39 and encoded therein. The data is then radio-transmitted via a transmission system from the modulating/demodulating section 34 through the high-frequency system circuit 32.

The reception and transmission states of the terminal unit are controlled by the control section 41 composed of a control means such as a microcomputer. The control section 41 is configured to be supplied with operational information from a key 42 such as a dial key. Furthermore, a display section 43 composed of a liquid crystal display panel is connected to the control section 41 to display the operational state.

Based on control information sent from the base station, the control section 41 according to this embodiment determines frequency channels (band slots) through which data is transmitted or received and the timings with which data is transmitted or received through these frequency channels in order to control each section of the terminal unit so as to execute corresponding processing. In this case, the control section 41 determines data transmitted in control information from the base station and required to assign the channels and executes the same processing as in steps 1 to 6 in FIG. 2 executed by the base station. The control section 41 then stores the correspondence state between the logical channel numbers and band slot numbers in each time slot. Specifically, data on the setting of [the number of band slots N×the number of time slots M] on each logical channel is used to execute the processing from step 1 to step 6 in FIG. 2. Data on the pseudo random numbers used to randomly change the band slot numbers is also transmitted from the base station. Such processing enables the terminal unit to determine the channel assignment state set by the base station, thereby enabling synchronous communication between the base station and the terminal unit even if the channels are assigned in real time as required.

Although the above embodiment according to the present invention applies the present resource assigning processing to the assignment of communication resources in a radio telephone system, the present resource assigning processing can be applied to resource assignment in other systems. The present invention is also applicable to the case in which a data processing unit such as a computer unit is used to process data and in which data (tasks) of different capacities must be mixed together and assigned to certain items (resources).

In addition, the details such as the communication and frame configurations according to the above embodiment are illustrative and these details are not limited to this embodiment. In particular, the above embodiment is applied to a communication system that transmits multicarrier signals, but the present communication resource assigning processing is applicable to various communication processing based on other communication methods.

According to the resource assigning method set forth in claim 1, simple arithmetic operations can be used to efficiently assign (n) continuous resources each having the same capacity to a plurality of tasks having different sizes.

According to the resource assigning method set forth in claim 2, if (n) continuous resources each having the same capacity is to be assigned to a plurality of tasks having different sizes, simple arithmetic operations can be used to efficiently assign the resources even if the relationship between the assigned resources and the tasks must be changed as required.

According to the resource assigning method set forth in claim 3, in the resource assigning method set forth in claim 2, pseudo random numbers are used for changing processing to make a changed state pseudo-random in order to enable the tasks to be changed almost evenly.

According to the communication resource assigning method set forth in claim 4, simple arithmetic operations can be used to efficiently assign (n) continuous slots each having the same capacity to a plurality of communication information having different sizes. Thus, the slots can be optimally and simply assigned depending on conditions such as the number of slots such as frequency bands which are assigned to a communication means and the amount of communication information transmitted.

According to the communication resource assigning method set forth in claim 5, simple arithmetic operations can be used to efficiently execute communication resource assigning processing for assigning (n) continuous slots each having the same capacity to a plurality of communication information having different sizes, even if the relationship between the assigned slots and the communication information must be changed as required.

According to the communication resource assigning method set forth in claim 6, in the communication resource assigning method set forth in claim 5, pseudo random numbers are used for changing processing to make a changed state pseudo-random in order to enable the correspondence changing between the slots and the communication information to be changed almost evenly.

According to the base station set forth in claim 7, if a communication resource composed of (n) continuous slots is assigned to each station and a plurality of units of communication information having different sizes is assigned to the communication resource and then transmitted to terminal units, the communication information can be optimally assigned to each slot depending on conditions such as the number of slots such as frequency bands which are assigned to that base station and the amount of communication information transmitted, enabling the slots to be constantly optimally assigned when the base station communicates with the terminal units.

According to the base station set forth in claim 8, in a base station set forth in claim 7, by changing the correspondence relationship between slots set by the communication resource setting means and each unit of communication information in a predetermined order, the base station can communicate with terminal units with optimal slot assignment even if the relationship between the assigned slots and communication information must be changed as required.

According to the base station set forth in claim 9, in a base station set forth in claim 8, setting the predetermined order using pseudo random numbers makes a changed state pseudo-random, thereby enabling the correspondence between slots and communication information to be changed evenly.

According to the base station set forth in claim 10, in a base station set forth in claim 8, information on the predetermined order is transmitted to a terminal unit to enable the unit to simply determine the changed state of the correspondence between slots and communication information, thereby enabling appropriate communication between the base station and the terminal unit.

According to the terminal unit set forth in claim 11, using simple arithmetic processing to determine slots, a base station to which a communication resource is assigned that is composed of (n) continuous slots each having the same transmission capacity can appropriately transmit a signal by assigning the communication resource with a plurality of units of communication information having different sizes.

According to the terminal unit set forth in claim 12, in a terminal unit set forth in claim 11, by changing the correspondence relationship between slots set by the communication resource setting means and each unit of communication information in a predetermined order, communication can be achieved appropriately in synchronism with any change made, even if the changing processing is performed, to the correspondence relationship for the assignment at the base station.

According to the terminal unit set forth in claim 13, in a terminal unit set forth in claim 12, the predetermined order is set using pseudo random numbers specified in control information to enable the terminal unit to constantly execute changing processing in conditions specified by the base station in order to synchronously communicate with the base station appropriately.

While there has been described in connection with the preferred embodiment of the invention, it will be obvious to those skilled in the art that various changes and modifications may be aimed, therefore, to cover in the appended claims all such changes and modifications as fall within the true spirit and scope of the invention.

What is claimed is:

1. A resource assigning method for assigning (n), wherein (n) is an arbitrary integer, continuous resources each having a same capacity to a plurality of tasks having different sizes, wherein the size of said plurality of tasks is represented as $c \times 2^k$ (k=0, 1, 2, ..., M) and the capacity of each of said resources is designated as (c), the method comprising:

an unavailable resource detecting step for detecting positions of unavailable resources;

an unassigned resource setting step for defining resources having a capacity of $c \times 2^k$ relative to respective ends of said (n) continuous resources as unassigned resources and for defining the unavailable resources having positions detected in said unavailable resource detecting step as unassigned resources;

a k-th resource assigning step for sequentially assigning resources other than said unassigned resources defined in said unassigned resource setting step from the respective ends at intervals of a capacity of $c \times 2^k$;

a first repeating loop for sequentially repeating said unassigned resource setting step and k-th resource assigning step until (k) has changed from M to 0 and using those resources of a capacity less than $c \times 2^k$ which could not be assigned in said k-th resource assigning step as original resources in a subsequent (k−1)-th resource assigning step;

a k-th task assigning step for assigning $c \times 2^k$ of tasks with $c \times 2^k$ of resources assigned by said sequentially repeating and after assigning these resources to all of said $c \times 2^k$ of tasks assigning resources to $c \times 2^{k-1}$ of tasks if there are resources remaining;

a (k−1)-th resource synthesizing step for dividing into two the resources to which the capacity of $c \times 2^{k-1}$ was assigned during said k-th task assigning step and synthesizing these two resources and the resources assigned in said (k−1)-th resource assigning step as original resources in a (k−1)-th task assigning step; and a second repeating loop for sequentially repeating said k-th task assigning step and said (k−1)-th resource synthesizing step until (k) changes from M to 0.

2. A resource assigning method for assigning (n), wherein (n) is an arbitrary integer, continuous resources each having a same capacity to a plurality of tasks having different sizes, wherein the size of said plurality of tasks is represented as $c \times 2^k$ (K=0, 1, 2, . . . , M) and the capacity of each of said resources is designated as (c), the method comprising:

an unavailable resource detecting step for detecting positions of unavailable resources;

an unassigned resource setting step for defining resources having a capacity of $c \times 2^k$ relative to respective ends of said (n) continuous resources as unassigned resources and defining the unavailable resources having positions detected tin said unavailable resource detecting step as unassigned resources;

a k-th resource assigning step for sequentially assigning resources other than said unassigned resources defined in said unassigned resource setting step from the respective ends at intervals of a capacity of $c \times 2^k$;

a first repeating loop for sequentially repeating said unassigned resource setting step and k-th resource assigning step until (k) has changed from M to 0 and using those resources of a capacity less than $c \times 2^k$ which could not be assigned in said k-th resource assigning step as original resources in the subsequent (k−1) th resource assigning step;

a k-th task assigning step for assigning $c \times 2^k$ of tasks with $c \times 2^k$ of resources assigned by said sequentially repeating and after assigning the resources to all of said $c \times 2^k$ of tasks assigning sources to $c \times 2^{k-1}$ of tasks if there are resources remaining;

a k-th assignment changing step for changing a correspondence between the resources and the tasks assigned during said k-th task assigning step;

a (k−1)-th resource synthesizing step for dividing into two the resources to which the capacity of $c \times 2^{k-1}$ was assigned during said k-th task assigning step and that were the divided resources and the resources assigned by said (k−1)-th resource assigning step, as original resources in a (k−1)-th task assigning step; and a second repeating loop for sequentially repeating said k-th task assigning step, said k-th assignment changing step, and said (k−1)-th resource synthesizing step until (k) changes from M to 0.

3. The resource assigning method according to claim 2 wherein said k-th assignment changing step includes the step of executing said change using pseudo random numbers.

4. A method for assigning a plurality of communication information having different sizes with a communication resource composed of (n), where (n) is an arbitrary integer, continuous slots each having a same capacity, characterized in that the size of said plurality of communication information is represented as $c \times 2^k$ (k=0, 1, 2, . . . , M) and the capacity of each of said (n) slots is designated as (c), the method comprising:

an unavailable slot detecting step for detecting positions of unavailable slots;

an unassigned communication resource setting step for defining as an unassigned resource a communication resource having in part a capacity of $c \times 2^k$ relative to respective ends of said communication resource of (n) continuous slots and defining the unavailable communication resource having positions detected in said unavailable slot detecting step as an unassigned resource;

a k-th communication resource assigning step for sequentially assigning the communication resource except for said unassigned part from the respective ends at intervals of a capacity of $c \times 2^k$;

a first repeating loop for sequentially repeating said unassigned communication resource setting step and k-th communication resource assigning step until (k) has changed from M to 0 using those communication resources of a capacity less than $c \times 2^k$ which could not assigned in said k-th communication resource assigning step as an original communication resource in a subsequent (k−1)-th communication resource assigning step;

a k-th communication information assigning step for assigning $c \times 2^k$ of communication information with $c \times 2^k$ of a communicating resource assigned by said repetition and after assigning said communication resource to all of said $c \times 2^k$ of communication information and for assigning a resource to $c \times 2^{k-1}$ of communication information if there is a resource remaining;

a (k−1)-th communication resource synthesizing step for dividing into two the communication resources to which the capacity of $c \times 2^{k-1}$ was assigned during said k-th communication information assigning step and synthesizing the two communication resources and the communication resource assigned in said (k−1)-th communication resource assigning step as an original communication resource in a (k−1)-th communication information assigning step; and a second repeating loop for sequentially repeating said k-th communication information assigning step and said (k−1)-th communication resource synthesizing step until (k) changes from M to 0.

5. A method for assigning a plurality of communication information having different sizes with a communication resource composed of (n), where (n) is an arbitrary integer, continuous slots each having a same capacity, characterized in that the size of said plurality of communicating information is represented as $c \times 2^k$ (k=0, 1, 2, . . . , M) and the capacity of each of said slot is designated as (c), the method comprising:

an unavailable slot detecting step for detecting positions of unavailable slots;

an unassigned communication resource setting step for defining as an unassigned resource a communication resource having in part a capacity of $c \times 2^k$ relative to respective ends of said communication resource of (n) continuous slots and defining the unavailable communication resource having positions detected in said unavailable slot detecting step as an unassigned resource;

a k-th communication resource assigning step for sequentially assigning the communication resource except for said unassigned part from the respective ends at intervals of a capacity of $c \times 2^k$;

a first repeating loop for sequentially repeating said unassigned communication resource setting step and k-th communication resource assigning step until (k) has changed from M to 0 using the communication resource of a capacity less than $c \times 2^k$ that could not be assigned in said k-th communication resource assigning as an original communication resource in a subsequent (k−1)-th communication resource assigning step;

a k-th communication information assigning step for assigning $c \times 2^k$ of communication information with $c \times 2^k$ of a communication resource assigned by said sequentially repeating and after assigning said communication resource to all of said $c \times 2^k$ of communication information and for assigning a resource to $c \times 2^{k-1}$ of communication information if there is a resource remaining;

a k-th communication information assignment changing step for changing a correspondence between the communication resource and the communication information assigned during the k-th communication information assigning step;

a (k−1)-th communication resource synthesizing step for dividing into two the communication resources to which the capacity of $c \times 2^{k-1}$ was assigned during said k-th communication information assigning step and that were changed by said k-th communication information assignment changing step and synthesizing the two divided communication resources and the communication resource assigned by said (k−1)-th communication resource assigning step as an original communication resource in a (k−1)-th communication information assigning step; and a second repeating loop for sequentially repeating said k-th communication information assigning step, said k-th communication information assignment changing step, and said (k−1)-th communication resource synthesizing step until (k) changes from M to 0.

6. The communication resource assigning method according to claim 5 wherein said k-th assignment changing step includes the step of executing said change using pseudo random numbers.

7. A base station to which a communication resource composed of (n), wherein (n) is an arbitrary integer, continuous slots each having a same transmission capacity (c) that assigns said communication resource with a plurality of units of communication information having different sizes represented by $c \times 2^k$ (k=0, 1, 2, . . . , M) before transmitting the information to a terminal unit, the base station comprising:

interfering-wave detecting means for detecting a slot position at which an interfering wave is present;

unassigned slot setting means for defining as an unassigned resource the communication resource having a capacity of $c \times 2^k$ relative to the respective ends of said communication resource of (n) continuous slots and defining the slot position detected by said interfering-wave detecting means as an unassigned position;

communication resource setting means for sequentially assigning the communication resource except for the slots defined as unassigned ones by said unassigned slot setting means to the same capacity of communication information from the respective ends at intervals of a capacity of $c \times 2^k$ and assigning that communication resource of a capacity less than $c \times 2^k$ that could not be assigned to the same capacity of communication information at intervals of a capacity of $c \times 2^k$ until (k) reaches a value that cannot be assigned; and communication processing means for communicating with the terminal unit using the slot assignment set by said communication resource setting means.

8. The base station according to claim 7 wherein the base station further comprises changing means for changing a correspondence between the slots set by said communication resource setting means and each unit of communication information in a predetermined order.

9. The base station according to claim 8 wherein said changing means comprises means for setting said predetermined order using pseudo random numbers.

10. The base station according to claim 8 further comprising means for transmitting information on said predetermined order to the terminal unit.

11. A terminal unit for communicating from a base station assigned with a communication resource composed of (n), where (n) is an arbitrary integer, continuous slots each having a same transmission capacity (c), wherein a signal is transmitted in such a way that said communication resource is assigned with a plurality of units of communication information having different sizes represented by $c \times 2^k$ (k=0, 1, 2, . . . M), the terminal unit comprising:

communication means for communicating with said base station;

slot assignment judging means for determining control information transmitted from said base station using said communication means and for judging a state in which said communication information is assigned based on slot assignment information included in the control information; and selection means for selecting a slot that communicates with said base station using said communication means based on the judgement executed by said slot assignment judging means, wherein in performing judgement processing, said slot assignment judging means executes:

unassigned slot setting processing for defining the communication resource having in part a capacity of $c \times 2^k$ relative to respective ends of said communication resource of at least (n) continuous slots as an unassigned resource; and communication resource setting processing for sequentially assigning the communication resource except for the slots defined as unassigned ones by said unassigned slot setting processing to a same capacity of communication information from the respective ends at intervals of a capacity of $c \times 2^k$ and assigning that communication resource of a capacity less than $c \times 2^k$ that could not be assigned to the same capacity of communication information at intervals of a capacity of $c \times 2^{k-1}$ until (k) reaches a value that cannot be assigned.

12. The terminal unit according to claim 11 wherein the terminal unit includes means for executing changing processing for changing a correspondence between the slots set by said communication resource setting processing and each unit of communication information in a predetermined order.

13. The terminal unit according to claim 12 wherein said predetermined order is set using pseudo random numbers specified in said control information.

\* \* \* \* \*